(12) United States Patent
Slutsky et al.

(10) Patent No.: US 12,482,133 B2
(45) Date of Patent: Nov. 25, 2025

(54) PERTURBATIVE ALIGNMENT CORRECTION FOR SURROUND CAMERAS

(71) Applicant: GM GLOBAL TECHNOLOGY OPERATIONS LLC, Detroit, MI (US)

(72) Inventors: Michael Slutsky, Kefar-Saba (IL); Yuval Zelig, Ramat Gan (IL); Lior Stein, Ramat HaSharon (IL); Avi Resler, Herzilya (IL)

(73) Assignee: GM Global Technology Operations LLC, Detroit, MI (US)

( * ) Notice: Subject to any disclaimer, the term of this patent is extended or adjusted under 35 U.S.C. 154(b) by 512 days.

(21) Appl. No.: 17/980,171

(22) Filed: Nov. 3, 2022

(65) Prior Publication Data
US 2024/0161339 A1    May 16, 2024

(51) Int. Cl.
*G06T 7/80* (2017.01)
*G06T 7/73* (2017.01)

(52) U.S. Cl.
CPC .......... *G06T 7/80* (2017.01); *G06T 7/73* (2017.01); *G06T 2207/30244* (2013.01)

(58) Field of Classification Search
CPC .... G06T 7/80; G06T 7/73; G06T 2207/30244
See application file for complete search history.

(56) References Cited

U.S. PATENT DOCUMENTS

2022/0301186 A1\* 9/2022 Nister .................. G06V 10/82

OTHER PUBLICATIONS

White ("An Iterative Pose Estimation Algorithm Based on Epipolar Geometry with Application to Multi-Target Tracking") IEEE/CAA Journal of Automatic Sinica. 2020. (Year: 2020).\*

\* cited by examiner

*Primary Examiner* — Molly Wilburn
(74) *Attorney, Agent, or Firm* — Quinn IP Law (57) ABSTRACT

A method and system for correcting alignment of images received from cameras by estimating camera alignment parameters based on perturbative correction such that corrected alignment parameters satisfy pairwise epipolar constraints as well as global loop closure constraints. The corrected alignment parameters are estimated as a Least-Mean-Square solution to a system of linear equations and an estimation algorithm may be implemented as a part of a Random Sample Consensus criterion estimation for improved robustness. The method and system is fast and efficient and may be implemented in a real-time system.

18 Claims, 5 Drawing Sheets

CAM 1 — 230

CAM 2 — 230

FIG. 5

PERTURBATIVE ALIGNMENT CORRECTION FOR SURROUND CAMERAS

INTRODUCTION

The present disclosure is related to cameras, and more specifically, to correcting alignment of images received from the cameras. The present disclosure provides a system and method for a vehicle image alignment system for aligning image data from a vehicle camera.

Cameras that are mounted on a vehicle, such as a rear-view camera, may become misaligned and captured images may not be correctly oriented or aligned with respect to the vehicle due to various factors, such as manufacturing tolerances and forces from events during vehicle travel. Therefore, the camera pose, which is a position and angle of the camera may become skewed or misaligned with respect to the vehicle.

It is desirable to provide a vehicle image alignment system and/or method that determines the alignment of each vehicle camera such that images displayed for a user or otherwise utilized by the vehicle may be aligned according to detected camera poses. The present disclosure addresses this issue.

SUMMARY

The present disclosure provides a method and system of aligning image data from a plurality of cameras installed on a vehicle by estimating incremental changes in camera poses of each of the plurality of cameras.

The method includes obtaining image data from each camera of the plurality of cameras, detecting a plurality of corresponding points (CP) of surround images (SI) to establish feature point correspondences for corresponding pairs of the plurality cameras and randomly choosing a subset of the CP, generating epipolar constraints for each corresponding pair of the plurality of cameras, generating closed-loop constraints for the plurality of cameras, calculating a Least Mean Square (LMS) solution (LMSS) for probative correction, and performing a random sample consensus (RANSAC) criterion estimation to quantify improvement in the epipolar constraints. The RANSAC criterion estimation is performed in an iterative loop (IL) until a solution that produces a below-threshold epipolar error for a specific maximum number of correspondences in corresponding pairs of SI.

The plurality of cameras may include cameras located at a front of the vehicle, at a rear of the vehicle, at a left side of the vehicle and at a right side of the vehicle. Establishing the feature point correspondence may include applying intrinsic camera models to translate image coordinates of each corresponding pair of the plurality of cameras into three-dimensional unit vectors in local camera frames of reference. Generating the epipolar constraints may include applying the equation $n_2^T (T \times Rn_1)=0$, where T is a translation between coordinate systems of each corresponding pair of the plurality of cameras and R is a rotation between the coordinate systems of each corresponding pair of the plurality of cameras.

Calculating the LMSS includes combining the epipolar equation for each adjacent pair of cameras, and closed loop constraint for the entire set of cameras into a single quadratic function. Generating the epipolar constraints may further include replacing the cross-product in the equation $n_2^T (T \times Rn_1)=0$ with a matrix multiplication as follows:

$$n_2^T T_\times Rn_1 = 0, \quad T_\times = \begin{bmatrix} 0 & -T_z & T_y \\ T_z & 0 & -T_x \\ -T_y & T_x & 0 \end{bmatrix}.$$

The method may further include approximating R by applying the following equations based on an assumption that a translation between coordinate systems of each corresponding pair of the plurality of cameras is constant:

$$R = R_0 \Delta R \approx R_0(1 + \Omega) \quad \Omega = \begin{bmatrix} 0 & -\Omega_z & \Omega_y \\ \Omega_z & 0 & -\Omega_x \\ -\Omega_y & \Omega_x & 0 \end{bmatrix},$$

where $\Omega x$, $\Omega y$, and $\Omega z$ are rotation angles around corresponding x, y, and z axes.

Generating the closed-loop constraints may include multiplying all corresponding rotation matrices together in a closed-loop fashion. Detecting the plurality of CP may include utilizing a standard feature descriptor. Detecting the plurality of CP may include filtering the plurality of CP by utilizing the epipolar constraints and a disparity map to filter matching points determined by the descriptor with original transformations after normalization and rejecting matching points determined by the descriptor that occur more than a specific number of times in the epipolar equations, where rejecting the matching points is based on a disparity criterion for rejecting points that are closer than a specific distance to or farther than a specific distance from the vehicle.

The system includes a plurality of cameras installed on a vehicle and a processor and memory accessible by the processor, where the memory includes computer instructions executed by the processor to perform the method.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for performing the disclosure when taken in connection with the accompanying drawings and appended claims. Moreover, the present disclosure expressly includes any and all combinations and sub-combinations of the elements and features presented previously and subsequently.

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The following description is merely exemplary in nature and is not intended to limit the present disclosure, application, or uses. It should also be understood that throughout the drawings, corresponding reference numerals indicate like or corresponding parts and features.

The present disclosure is susceptible of embodiment in many different forms. Representative examples of the disclosure are illustrated in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Current vehicle image alignment systems and methods typically calculate misalignment of a vehicle camera based on a yaw angle, a pitch angle, and a roll angle with respect to a vehicle chassis frame of reference, such as a center of a rear axle, and then align or calibrate image data based on the calculated misalignment. Such vehicle image alignment systems and methods may obtain image data having a plurality of image frames and sensor data, such as vehicle velocity, and then perform a camera alignment estimation process that includes both a yaw/pitch estimation process and a roll estimation process, The yaw/pitch estimation process is used to obtain a yaw misalignment estimate and a pitch misalignment estimate, and the roll estimation process is utilized to obtain a roll misalignment estimate. The yaw misalignment estimate, the pitch misalignment estimate, and the roll misalignment estimate represent estimates of the misalignment of the camera relative to the vehicle body with respect to, respectively, the yaw, the pitch, and the roll.

The current camera alignment estimation process may utilize Multiview Geometry Techniques, such as visual odometry and/or structure from motion (SfM), as well as perspective-n-point (PnP) techniques and triangulation techniques. The yaw misalignment estimate, the pitch misalignment estimate, and the roll misalignment estimate, which are examples of CAI, are utilized to obtain an angular misalignment of the camera pose, which may then be utilized to rotate and/or otherwise align the image data captured by the camera such that the image data is aligned with respect to the vehicle.

While the term "camera pose" is generally understood to refer to both the camera's position and the camera's angular disposition, the vehicle image alignment system and method are primarily utilized for determining an angular misalignment of the camera with respect to the vehicle. Therefore, the term "camera pose" as referred to herein, may not necessarily refer to the camera's position or displacement.

The current camera alignment estimation process may be performed numerous times or periodically. Therefore, numerous yaw misalignment estimates, pitch misalignment estimates, and roll misalignment estimates may be generated and stored as yaw/pitch angle estimation (YPAE) history and a roll angle estimation (RAE) history. Statistical analysis performed on these estimation histories for each of three angles, specifically the yaw angle, the pitch angle, and the roll angle, to obtain CAI, such as representative yaw angle, a representative pitch angle, and a representative roll angle. These representative estimates may then be utilized to rotate and/or otherwise align the image data captured by the camera.

Figure 1:
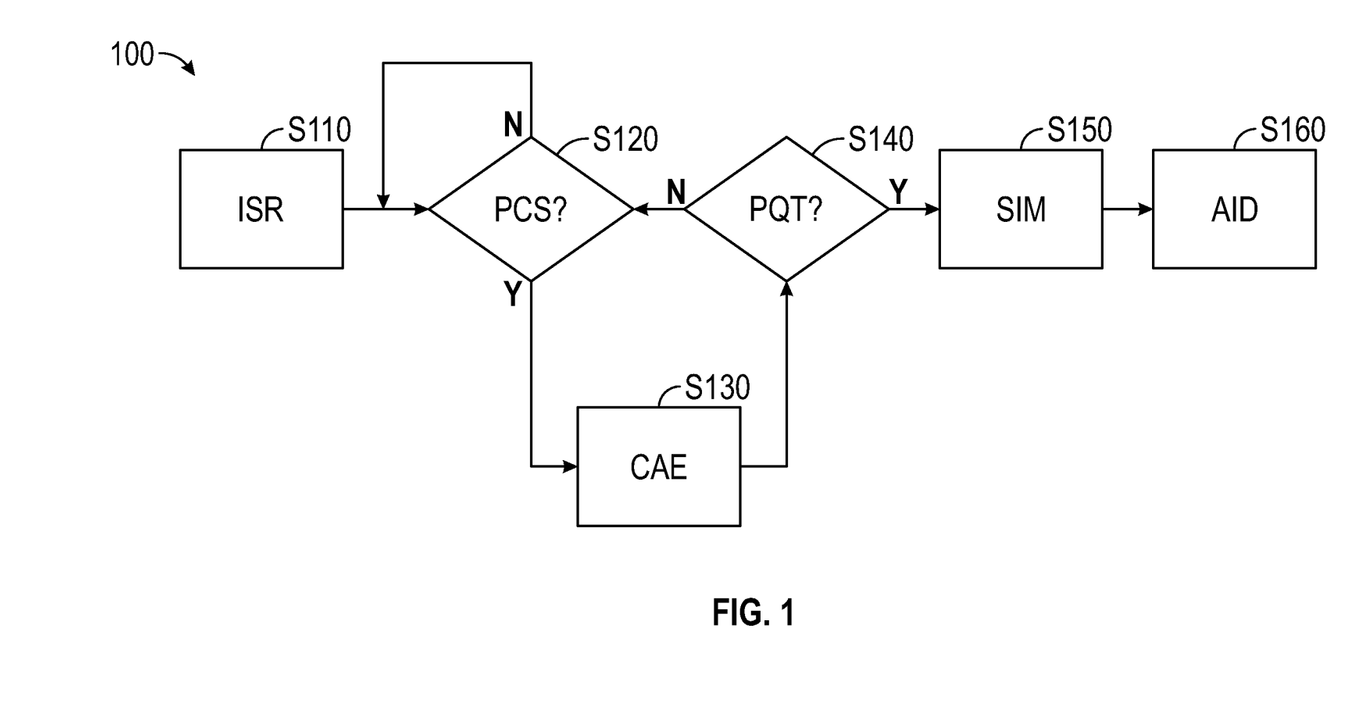
FIG. 1 illustrates a current camera alignment estimation process.

FIG. 1 illustrates a current camera alignment estimation process. Specifically, FIG. 1 illustrates a flowchart of a method 100 of aligning image data from a vehicle camera.

The method 100 begins with step S110 when an Indication to Start the method is Received (ISR). The ISR may be an "automatic start indication" or a "manual start indication."

In step S120, it is determined if one or more Predefined Conditions of a camera alignment estimation process are Satisfied (PCS). The predefined conditions may indicate that the camera alignment estimation process (step S130) needs to be performed. When it is determined that the predefined condition(s) are satisfied, the method 100 proceeds to step S130.

In step S130, a camera alignment estimation (CAE) process is performed. The CAE process obtains Camera Alignment Information (CAI) that includes information related to an alignment and/or orientation of a yaw angle, a pitch angle, and/or a roll angle. Once the CAI is obtained, the method 100 continues to step S140.

In step S140, it is determined whether the CAI meets Predefined Quality Thresholds (PQT). If it is determined that the PQT are not met, the method 100 proceeds back to step S120 where it is again determined if the one or more Predefined Conditions are Satisfied (PCS). If it is determined that the PQT are met, the method 100 proceeds to step S150.

In step S150, the CAI is Saved In Memory (SIM) and the method 100 proceeds to step S160. In step S160, the CAI is utilized to Align Image Data (AID) obtained from the camera.

Cameras, specifically surround vision cameras, require precise alignment, such as camera-to-camera and camera-to-chassis alignment. However, factory alignment of cameras mounted on a vehicle lose their precision quickly due to mechanical vibrations and installation on moving parts, such as mirrors and tailgates.

Although auto-alignment algorithms may be utilized to estimate up-to-date camera poses, auto-alignment is a computationally intensive process that requires vehicle motion and does not take into account prior approximate camera poses. Furthermore, alignment precision loss is usually smaller than overall camera rotation (R) and translation (T), which makes incremental, or "perturbative," treatment applicable The present disclosure provides estimation of camera alignment parameters based on perturbative correction such that corrected alignment parameters satisfy pairwise epipolar constraints as well as global loop closure constraints, where corrected alignment parameters are estimated as a Least Mean Square (LMS) solution to a system of linear equations and an estimation algorithm may be implemented as a part of a Random Sample Consensus (RANSAC) process for improved robustness. The approach of the present disclosure is fast and efficient and may be implemented in a real-time system. Although vehicle motion is not mandatory, input scene diversity provided by movement improves algorithm robustness.

Figure 2:
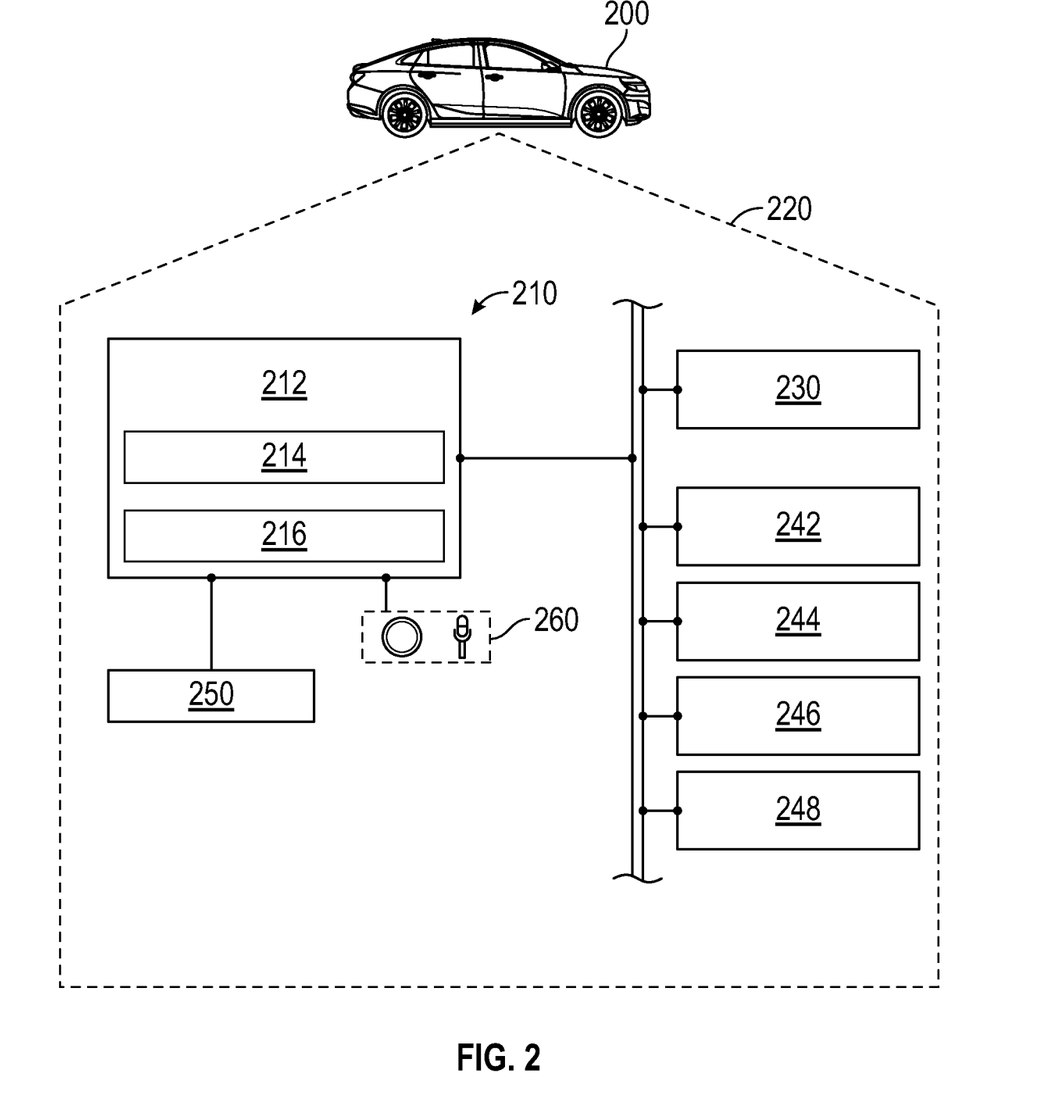
FIG. 2 illustrates a vehicle image alignment system according to an embodiment of the present disclosure.

FIG. 2 illustrates a vehicle image alignment system according to an embodiment of the present disclosure. Specifically, FIG. 2 illustrates a vehicle 200 to which an image alignment system 210 of the present disclosure in applied.

The image alignment system 210 may be utilized to determine CAI for adjusting image data obtained by a plurality of cameras such that an image is provided to a user and/or otherwise utilized by the vehicle 200 in a correct orientation or aligned properly. The image alignment system 210 may include electronics 220 a plurality of cameras 230, a plurality of sensors 242-248, a display 250, and a plurality of user interfaces 260. The image alignment system 210 may include other components, devices, units, modules and/or other parts.

Although vehicle 200 is illustrated in FIG. 2 as a passenger car, the vehicle 200 may be any vehicle, such as a motorcycle, a truck, a sports utility vehicle (SUV), a crossover vehicle, a recreational vehicle (RV), or a tractor trailer, as well as a boat or other vehicle.

Portions of the electronics 220 are generally illustrated in FIG. 2 and may include a video processing module 212, a processor 214, memory 216, the plurality of cameras 230, the plurality of sensors 242-248, the display 250, and the user interfaces 260. Some, or all, of the electronics 220 may be connected by wired or wireless communication via one or more communication busses or networks, such as communications bus 270.

The communications bus 270 provides the electronics 220 with network connections via one or more network protocols and utilizes a serial data communication architecture. Examples of suitable network connections include a controller area network (CAN), a media-oriented system transfer (MOST), a local interconnection network (LIN), a local area network (LAN), and other appropriate connections, such as Ethernet, which conforms with known ISO, Society of Automotive Engineers (SAE), and IEEE standards and specifications.

Although the various components of the electronics 220 are illustrated as stand-alone components in FIG. 2, the components may be integrated, combined and/or otherwise shared with other vehicle components. For example, the video processing module 212 may be part of a larger vehicle infotainment or safety system (not illustrated).

The video processing module 212 receives image data from the each of the plurality of cameras 230 and performs a camera alignment estimation process to obtain CAI to adjust the received image data such that it is correctly aligned and/or oriented. The video processing module 212 may include the processor 214 and memory 216, with the processor 213 configured to execute computer instructions that perform one or more step(s) of the method of the present disclosure. The computer instructions may be embodied in one or more computer programs or products stored in memory 216, in other memory devices of the electronics 220, or in a combination thereof.

The video processing module 212 may include a graphics processing unit (GPU), a graphics accelerator and/or a graphics card or module. The video processing module 212 may include multiple processors, including one or more general purpose processor(s) or central processing unit(s), as well as one or more GPU(s), graphics accelerator(s) and/or graphics card(s) or module(s). The video processing module 212 may be directly coupled (as illustrated in FIG. 2) or indirectly coupled via communications bus 270 to the display 250 and/or other user interfaces.

The plurality of cameras 230 may include a rear-view camera facing an area behind the vehicle 200 and providing image data for display and/or utilized for acquiring information related to the area behind the vehicle 200 and within the field of view of the plurality of cameras 230, which may be utilized for Autonomous Vehicle (AV) functionality. The plurality of cameras 230 may include a forward-view camera facing an area in front of the vehicle 200, or a side-view camera facing an area to a side of the vehicle 200.

Each of the plurality of cameras 230 may be utilized to capture images, videos, and/or other information related to the surroundings of the vehicle 200 (herein referred to as "image data") and may be any suitable camera type. Each of the plurality of cameras 230 may include a processor and/or memory within the corresponding camera or may include such hardware as part of a larger module or unit, such as the video processing module 212.

The sensors 242-248 provide the image alignment system 210 with various types of sensor data utilized as a part of the camera alignment estimation process of the present disclosure. Sensor 242 may be a transmission sensor that is part of a transmission control unit (TCU), an engine control unit (ECU), or some other vehicle device or may be a stand-alone sensor. The transmission sensor 242 may determine a gear in which the vehicle 200 is presently in, such as neutral, park, reverse, drive, first gear, or second gear, and provide the image alignment system 210 with transmission data as a type of sensor data. The transmission sensor 242 may provide transmission data to the video processing module 212 via the communications bus 270.

The sensor 244 may be directly or indirectly coupled to a steering wheel of vehicle 200 and provide steering wheel data as a type of sensor data to the image alignment system 210. The sensor 244 may provide steering wheel data to the video processing module 212 via the communications bus 270.

The sensor 246 may be a movement sensor that determines a speed, velocity and/or acceleration of the vehicle 200 and provides the information as speed data as a type of sensor data to the image alignment system 210. The sensor 246 may include one or more suitable sensor(s) or component(s), such as wheel speed sensors, global navigation satellite system (GNSS) receivers, and speed sensors (VSS). Furthermore, the sensor 246 may be part of another vehicle device, unit and/or module, or it may be a stand-alone sensor. The sensor 246 may provide speed data to the video processing module 212 via the communications bus 270.

The vehicle 200 may include other sensors 248 utilized to obtain movement or inertial information related to the vehicle 200, such as vehicle speed, acceleration (longitudinal and/or lateral), yaw (and yaw rate), pitch, roll, and various other attributes related to movement. The other sensors 248 may be located on the vehicle 200 in a variety of locations. The other sensors 248 may be coupled to various other sensors, devices, units, modules and/or systems directly or via communications bus 270.

The electronics 220 may also include other interfaces that allow users to exchange information by providing and/or receiving information to and/or from the image alignment system 210. For example, the display 250 and the user interfaces 260 may include a combination of pushbuttons, knobs, graphic interfaces, microphones, and audio systems. As used herein, the term "user interface" broadly includes any of electronic device, including both hardware and software that enables a user to exchange information or data with the vehicle 200.

The display 250 is a type of user interface and, specifically, an electronic visual display utilized to display various images, video and/or graphics. The display 250 may be a liquid crystal display (LCD), a plasma display, a light-emitting diode (LED) display, an organic LED (OLED) display, or other suitable electronic display. The display 250 may also be a touch-screen display capable of detecting touch such that the display 250 functions as both an input and an output device. The display 250 may be coupled to the video processing module in order to receive display data. The display 250 may be utilized to present image data obtained from the plurality of cameras 230 and/or other cameras and display aligned image data generated by the camera alignment process of the present disclosure.

The user interfaces 260 may include a combination of hardware and/or software pushbutton(s), knob(s), control(s), microphone(s), audio system(s), graphic interface(s), or menu option(s). Although the display 250 and the user interfaces 260 are illustrated in FIG. 2 as directly connected to the video processing module 212, they may be indirectly connected to the video processing module 212, or be part of other devices, units or modules in the electronics 220.

Any one or more of the disclosed processors, such as processor 214, another processor of the video processing module 212 or of the electronics 220, may be a device capable of processing electronic instructions including microprocessors, microcontrollers, host processors, controllers, vehicle communication processors, a GPU, accelerators, Field Programmable Gated Arrays (FPGA), and Application Specific Integrated Circuits (ASICs). The processor may execute various types of electronic instructions, such as software and/or firmware programs stored in the memory 216.

The memory 216, may be a non-transitory computer-readable medium, which includes different types of random-access memory (RAM), various types of dynamic RAM (DRAM) and static RAM (SRAM), read-only memory (ROM), solid-state drives (SSDs) including other solid-state storage such as solid-state hybrid drives (SSHDs), hard disk drives (HDDs), magnetic or optical disc drives, or other suitable computer medium that electronically stores information. Although certain devices or components of the electronics 220 are disclosed as including a processor and/or memory, the processor and/or memory may be shared with other devices or components and/or be part of other devices or components of the electronics 220.

Figure 3:
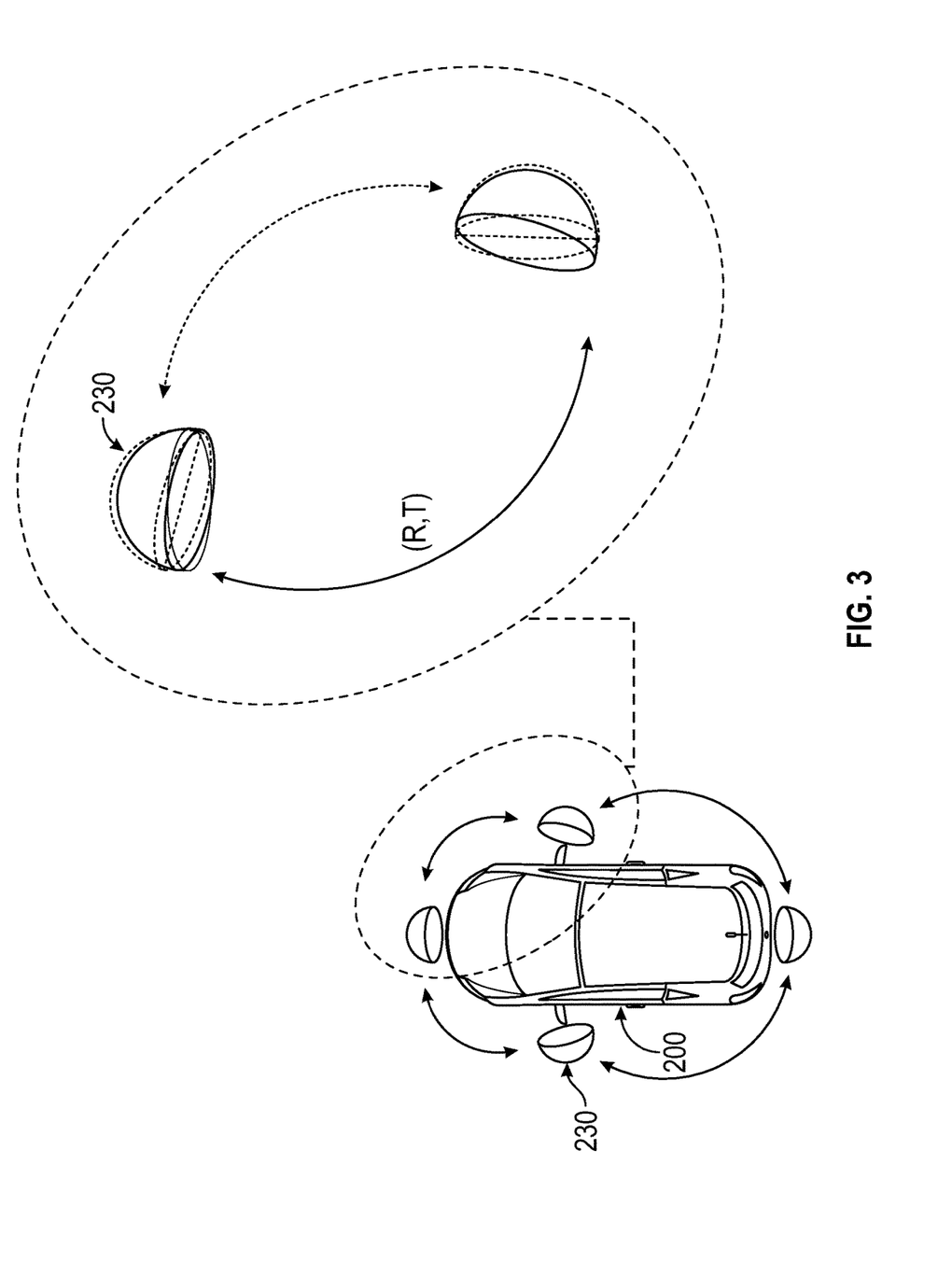
FIG. 3 illustrates estimating incremental changes in camera poses according to an embodiment of the present disclosure.

FIG. 3 illustrates estimating incremental changes in camera poses according to an embodiment of the present disclosure. As illustrated in FIG. 3, "R" is a rotation between coordinate systems of the plurality of the pair of cameras 230 and "T" is a translation between the coordinate systems of the plurality of the pair of cameras 230. For any pair of the plurality of cameras 230, actual camera poses (R, T) may be estimated using incremental changes in camera poses ($\Delta R$, $\Delta T$) and nominal camera poses ($R_0$, $T_0$) in order to satisfy constraints derived from current image data, based on the abstract equation:

$$(R,T)=(R_0,T_0)\times(\Delta R,\Delta T).$$

Figure 4:
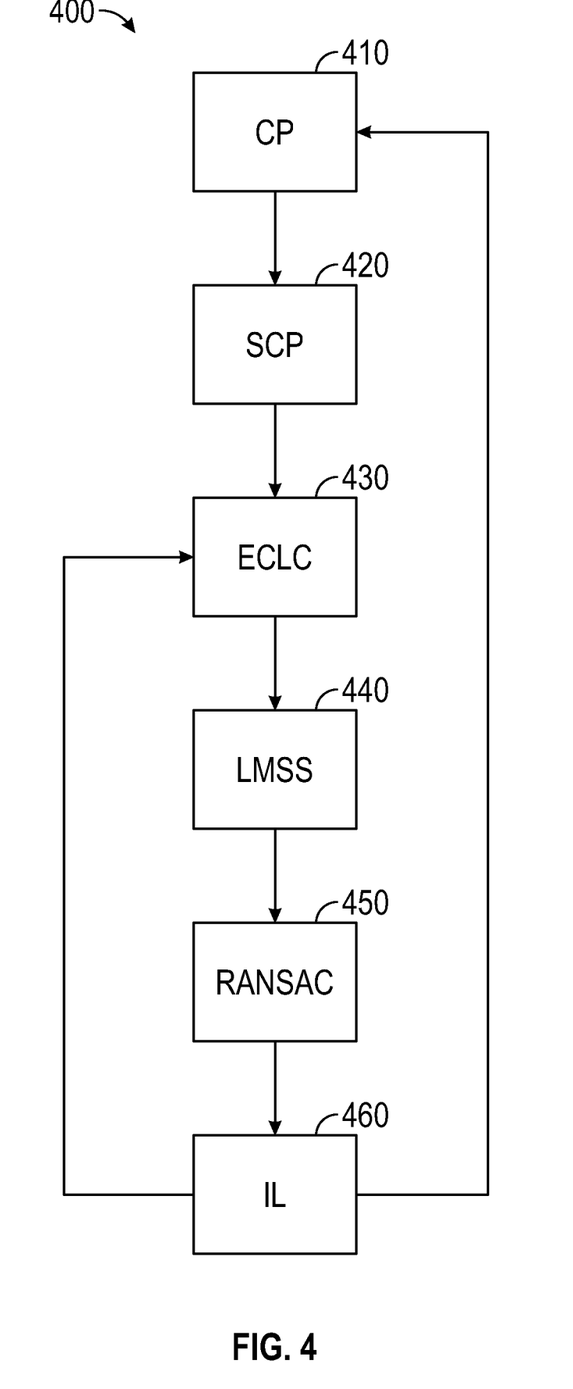
FIG. 4 illustrates a method for aligning camera images according to an embodiment of the present disclosure.

FIG. 4 illustrates a method 400 for aligning camera images according to an embodiment of the present disclosure. As illustrated in FIG. 4, the method 400 begins with step S410, where Corresponding Points (CP) of Surround Images (SI) are detected to establish feature point correspondences for each corresponding pair of the plurality of cameras 230, and then continues to step S420, where a Subset of the Corresponding Points (SCP) is randomly chosen. The method 400 then continues to step S430.

In step S430, Epipolar Constraints are generated for each pair of adjacent cameras 230, and Closed Loop Constraints are generated for the entire plurality of at least three of the cameras (ECLC). The method 400 then continues to Step S440.

In step S440, an LMS Solution (LMSS) for probative correction is calculated. The method 400 then continues to step S450.

In step S450, a RANSAC criterion estimation process is performed to quantify improvement in the epipolar constraints. The method 400 then continues to step S460.

In step S460, the RANSAC criterion estimation process is performed in an Iterative Loop (IL) to determine a solution that produces a below-threshold epipolar error for a specific maximum number of correspondences in adjacent pairs of SI. When such a solution is determined, the method 400 ends.

Figure 5:
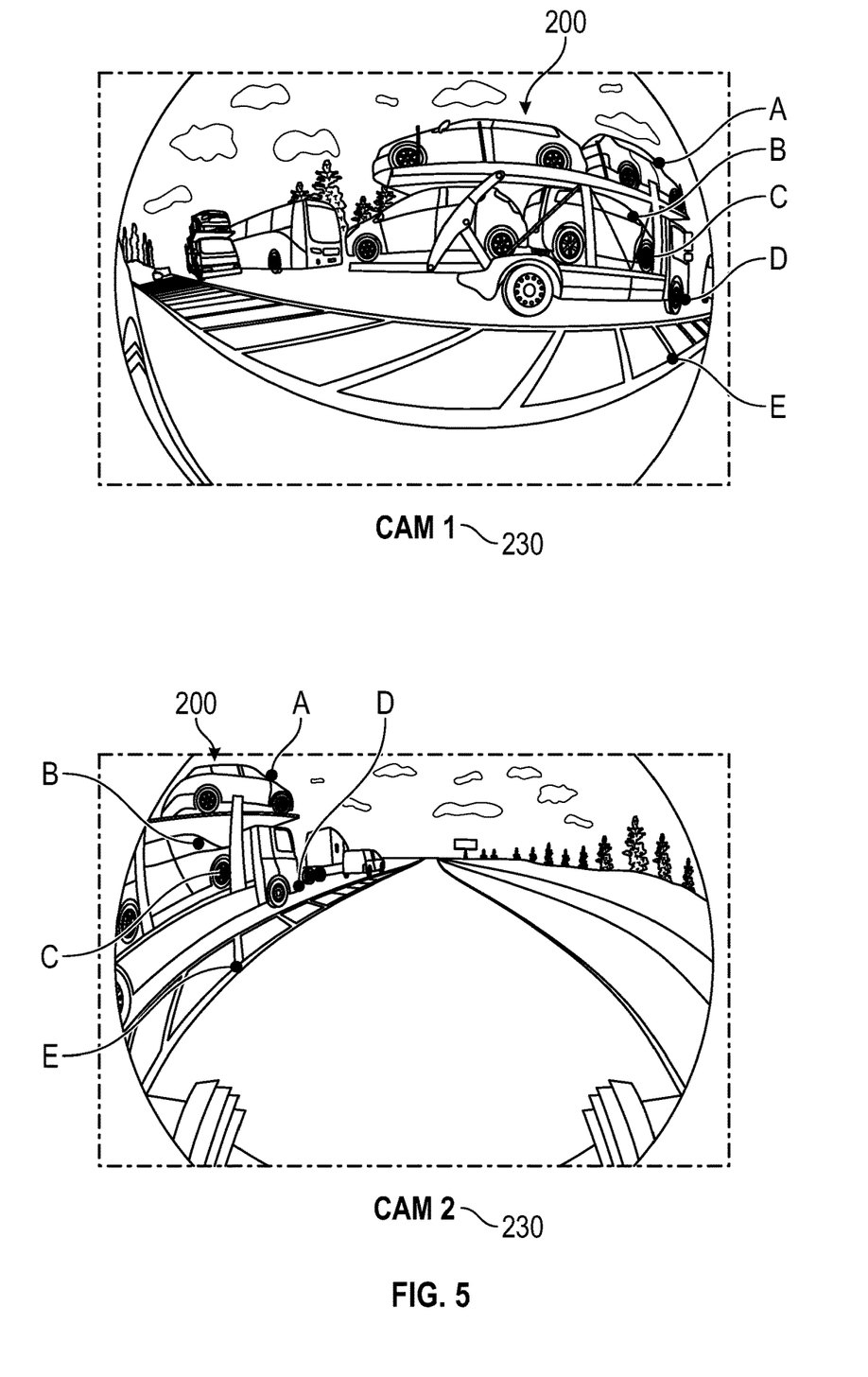
FIG. 5 illustrates establishing feature point correspondence for adjacent pairs of cameras according to an embodiment of the present disclosure.

FIG. 5 illustrates establishing feature point correspondence for adjacent pairs of cameras 230 according to an embodiment of the present disclosure. Intrinsic camera models are applied to translate image coordinates $[u_j, v_j]$ for corresponding feature points (j) of each of the adjacent pairs of cameras 230 into three-dimensional (3D) unit vectors n j in local camera frames of reference.

As illustrated in FIG. 5, step S410 in FIG. 4 may detect five CP of the SI, specifically CP "A" to "D" between a first camera 230 (CAM 1) and a second camera 230 (CAM 2) of an adjacent pair of cameras. As further illustrated in FIG. 5, the correspondence is established between CAM 1 located at a right side of the vehicle 200 and CAM 2 at a left side of the vehicle 200.

It is noted that the correspondence in FIG. 5 may be determined for any number of pairs of cameras 230 located at various positions on the vehicle 200, such as pairs of cameras 230 also located at a right-rear side and right-front side, a right-rear side and left-rear side, a right-front side and left-front side, and/or a right-front side and left-front side as well as other locations. It is further noted that more or less than 5 CP may be detected with the specific location of the various CP detected not limited to location "A" through "D" illustrated in FIG. 5.

In step S430 of FIG. 4, the following epipolar equation may be utilized to generate the epipolar constraints for each pair of adjacent cameras 230:

$n_2^T$ $(T \times Rn_1)=0$, where the cross-product may be replaced with a matrix multiplication as follows:

$$n_2^T T_\times Rn_1 = 0, \; T_\times = \begin{bmatrix} 0 & -T_z & T_y \\ T_z & 0 & -T_x \\ -T_y & T_x & 0 \end{bmatrix}$$

Then, based on an assumption that the T between the adjacent cameras 230 is constant, R may be written as nominal $R_0$ multiplied by a small perturbation matrix, which can be approximated by the following equations:

$$R = R_0 \Delta R \simeq R_0(1+\Omega) \quad \Omega = \begin{bmatrix} 0 & -\Omega_z & \Omega_y \\ \Omega_z & 0 & -\Omega_x \\ -\Omega_y & \Omega_x & 0 \end{bmatrix},$$

where $\Omega x$, $\Omega y$, and $\Omega z$ are small rotation angles around, respectively, the x, y, and z axes. Then:

$$n_2^T T_\times R_0 n_1 = n_2^T T_\times R_0 n_1 \times \vec{\Omega}, \vec{\Omega} = \begin{bmatrix} \Omega_x \\ \Omega_y \\ \Omega_z \end{bmatrix}$$

When aggregating N correspondence pairs, a system of linear equations of the following form results:

$$b_{N\times 1} = A_{N\times 3} \vec{\Omega}$$

This epipolar equation can be applied to each one of the pairs of cameras 230. The pairs of cameras 230 may be located at front-right (1-3)/rear-right-(3-4) and rear-left (4-2)/front-left (2-1) sides of the vehicle 200 and fi $\vec{\Omega}_{13}$, $\vec{\Omega}_{34}$, $\vec{\Omega}_{42}$, $\vec{\Omega}_{21}$ may be defined for, respectively, each pair of adjacent cameras 230. Furthermore, each adjacent pair of cameras 230 can be aggregated into one system of Nt equations, using $\vec{\Omega}_{tot}$, which is a vector with 4×3=12 elements as follows:

$$A_{Nt\times 12}\vec{\Omega}_{tot} = b_{Nt\times 1} \quad Nt = \sum_{\substack{camera \\ pairs}} N \quad \text{(EQ. 1)}$$

In step S430 of FIG. 4, the closed-loop constraints may be generated by multiplying all relative rotation matrices together in a closed-loop fashion, such as in the order of right-front/right-rear, left-rear/left-front), which yields the identity matrix. For a standard case of four surround cameras the closed-loop constraint becomes:

$R_{13}R_{34}R_{42}R_{21}=1$, where small perturbations have a linear order in $\Omega_i$ of: $R_1(I+\Omega_1)R_2(I+\Omega_2)R_3(I+\Omega_3)R_4(I+\Omega_4) \simeq 1$, where $R_i$ is the nominal rotation matrix for camera pair I and the loop constraint can be rewritten in the form:

$$K\vec{\Omega}_{tot} = 0, \text{ where:}$$

$$K = \begin{bmatrix} K_{11} & K_{12} & K_{13} & K_{14} \\ K_{21} & K_{22} & K_{23} & K_{24} \\ K_{31} & K_{32} & K_{33} & K_{34} \end{bmatrix}, \begin{aligned} K_{i1} &= -R_1[V_{i1}]_\times & V_{i1} &= R_1^T e_i \\ K_{i2} &= -R_1 R_2[V_{i2}]_\times & V_{i2} &= R_3 R_4 e_i \\ K_{i3} &= -R_4^T[V_{i3}]_\times & V_{i3} &= R_4 e_i \\ K_{i4} &= -[V_{i4}]_\times & V_{i1} &= e_i \end{aligned} \text{ and}$$

$$[a]_\times = \begin{bmatrix} 0 & -a_z & a_y \\ a_z & 0 & -a_x \\ -a_y & a_x & 0 \end{bmatrix}$$

In step S430 of FIG. 4, the epipolar equations for each corresponding pair of cameras and the closed loop constraint are combined into a single cost function $$L_\lambda(\vec{\Omega}_{tot}) = \|A\vec{\Omega}_{tot} - b\|^2 + \lambda^2 \|K\vec{\Omega}_{tot}\|^2,$$

where $\lambda$ is a regularization parameter balancing between the local (epipolar) and the global (closed-loop) consistency errors.
such that the LMSS is:

$$\vec{\Omega}^*_{tot}[\lambda] = (A^T A + \lambda^2 K^T K)^{-1}(A^T b)$$

The CP for the epipolar equations may be detected by utilizing a descriptor that is a standard feature descriptor, such as SIFT, Accelerated KAZE (AKAZE), or Speeded Up Robust Features (SURF). However, the descriptor may not determine good matching points and, therefore, the CP may be filtered by utilizing the initial epipolar constraint and a disparity map to filter the matching points with the original transformations after normalization and reject matching points that occur more than a specific number of times in the epipolar equation and utilizing a disparity criterion for rejecting points that are closer than a specific distance to or farther than a specific distance from the vehicle 200.

The present disclosure provides corrected alignment of images received from cameras and sensors. The present disclosure addresses a need to determine alignment of each camera such that images may be aligned according to detected camera poses.

The detailed disclosure and the drawings are supportive and descriptive of the present disclosure, but the scope of the present disclosure is defined solely by the appended claims. While some of the best modes and other embodiments for performing the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications may be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

What is claimed is:

1. A method of aligning image data from a plurality of cameras installed on a vehicle, the method comprising:
   estimating, via a video processing module, incremental changes in camera poses of each of the plurality of cameras; and
   aligning, via the video processing module, image data from the plurality of cameras based on the estimated incremental changes in the camera poses to provide an aligned image to one of a user and/or the vehicle, wherein estimating incremental changes in the camera poses includes:
      obtaining, via the video processing module, image data from each of the plurality of cameras;
      detecting, via a plurality of sensors, a plurality of corresponding points (CP) of surround images (SI) to establish feature point correspondences for corresponding pairs of the plurality of cameras and randomly choosing a subset of the CP, wherein establishing the feature point correspondence includes applying intrinsic camera models to translate image coordinates of each corresponding pair of the plurality of cameras into three-dimensional unit vectors in local camera frames of reference;

generating, via the video processing module, epipolar constraints for each corresponding pair of the plurality of cameras;

generating, via the video processing module, closed-loop constraints for the plurality of cameras;

calculating, via the video processing module, a Least Mean Square (LMS) solution (LMSS) for probative correction; and performing, via the video processing module, a random sample consensus (RANSAC) criterion estimation to quantify improvement in the epipolar constraints, wherein:

the RANSAC criterion estimation is performed, via the video processing module, in an iterative loop (IL) until a solution that produces a below-threshold epipolar error for a specific maximum number of correspondences in corresponding pairs of SI.

2. The method of claim 1, wherein generating the closed-loop constraints comprises multiplying all corresponding rotation matrices together in a closed-loop fashion.

3. The method of claim 1, wherein detecting the plurality of CP comprises utilizing a standard feature descriptor.

4. The method of claim 3, wherein detecting the plurality of CP comprises:

filtering the plurality of CP by utilizing the epipolar constraints and a disparity map to filter matching points determined by the descriptor with original transformations after normalization; and rejecting matching points determined by the descriptor that occur more than a specific number of times in the epipolar equations, wherein rejecting the matching points is based on a disparity criterion for rejecting points that are closer than a specific distance to or farther than a specific distance from the vehicle.

5. The method of claim 1, wherein the plurality of cameras comprise cameras located at a front of the vehicle, at a rear of the vehicle, at a left side of the vehicle and at a right side of the vehicle.

6. A method of aligning image data from a plurality of cameras installed on a vehicle, the method comprising:

estimating incremental changes in camera poses of each of the plurality of cameras; and aligning image data from the plurality of cameras based on the estimated incremental changes in the camera poses to provide an aligned image to one of a user and/or the vehicle, wherein estimating incremental changes in the camera poses includes:

obtaining, via a video processing module, image data from each of the plurality of cameras;

detecting, via a plurality of sensors, a plurality of corresponding points (CP) of surround images (SI) to establish feature point correspondences for corresponding pairs of the plurality of cameras and randomly choosing a subset of the CP;

generating, via the video processing module, epipolar constraints for each corresponding pair of the plurality of cameras, wherein generating the epipolar constraints comprising applying the equation $n_2^T (T \times R\, n_1) = 0$, wherein T is a translation between coordinate systems of each corresponding pair of the plurality of cameras, and wherein R is a rotation between the coordinate systems of each corresponding pair of the plurality of cameras;

generating, via the video processing module, closed-loop constraints for the plurality of cameras;

calculating, via the video processing module, a Least Mean Square (LMS) solution (LMSS) for probative correction; and performing, via the video processing module, a random sample consensus (RANSAC) criterion estimation to quantify improvement in the epipolar constraints, wherein the RANSAC criterion estimation is performed, via the video processing module, in an iterative loop (IL) until a solution that produces a below-threshold epipolar error for a specific maximum number of correspondences in corresponding pairs of SI.

7. The method of claim 6, wherein calculating the LMSS comprises combining the epipolar equation for each corresponding pair of the plurality of cameras and closed loop constraint for an entire set of the plurality of cameras into a single quadratic function such that the LMSS is $\vec{\Omega}_{tot}*[\lambda] = (A^T A + \lambda^2 K^T K)^{-1} (A^T b)$.

8. The method of claim 6, wherein generating the epipolar constraints further comprises replacing the cross-product in the equation $n_2^T (T \times R\, n_1) = 0$ with a matrix multiplication as follows:

$$n_2^T T_\times R n_1 = 0,\ T_\times = \begin{bmatrix} 0 & -T_z & T_y \\ T_z & 0 & -T_x \\ -T_y & T_x & 0 \end{bmatrix}.$$

9. The method of claim 6, further comprising approximating R by applying the following equations based on an assumption that a translation between coordinate systems of each corresponding pair of the plurality of cameras is constant:

$$R = R_0 \Delta R \simeq R_0 (1 + \Omega) \quad \Omega = \begin{bmatrix} 0 & -\Omega_z & \Omega_y \\ \Omega_z & 0 & -\Omega_x \\ -\Omega_y & \Omega_x & 0 \end{bmatrix},$$

wherein $\Omega_x$, $\Omega_y$, and $\Omega_z$ are rotation angles around corresponding x, y, and z axes.

10. A system of aligning image data, the system comprising:

a plurality of cameras installed on a vehicle; and a video processing module in communication with the plurality of cameras, the video processing module including a processor and memory accessible by the processor, wherein the memory includes computer instructions executed by the processor to:

estimate, incremental changes in camera poses of each of the plurality of cameras; and align image data from the plurality of cameras based on the estimated incremental changes in the camera poses to provide an aligned image to one of a user and/or the vehicle, wherein estimating incremental changes in the camera poses includes:

causing each of the plurality of cameras to obtain image data;

detecting a plurality of corresponding points (CP) of surround images (SI) to establish feature point correspondences for corresponding pairs of the plurality of cameras and randomly choose a subset of the CP, wherein establishing the feature point correspondence includes applying intrinsic camera models to translate image coordinates of each corresponding pair of the plurality of cameras into three-dimensional unit vectors in local camera frames of reference;

generating epipolar constraints for each corresponding pair of the plurality of cameras;

generating closed-loop constraints for the plurality of cameras;

calculating a Least Mean Square (LMS) solution (LMSS) for probative correction; and performing a random sample consensus (RANSAC) criterion estimation to quantify improvement in the epipolar constraints, wherein:

the RANSAC criterion estimation is performed in an iterative loop (IL) until a solution that produces a below-threshold epipolar error for a specific maximum number of correspondences in corresponding pairs of SI.

11. The system of claim 10, wherein:

generating the epipolar constraints comprises applying the equation $n_2^T(T \times R\, n_1)=0$;

T is a translation between coordinate systems of each corresponding pair of the plurality of cameras; and R is a rotation between the coordinate systems of each corresponding pair of the plurality of cameras.

12. The system of claim 11, wherein calculating the LMSS comprises combining the epipolar equation for each corresponding pair of the plurality of cameras and closed loop constraint for an entire set of the plurality of cameras into a single quadratic function such that the LMSS is $\vec{\Omega}_{tot}*[\lambda]=(A^T A + \lambda^2 K^T K)^{-1}(A^T b)$.

13. The system of claim 11, wherein generating the epipolar constraints further comprises replacing the cross-product in the equation $n_2^T(T \times R\, n_1)=0$ with a matrix multiplication as follows:

$$n_2^T T_\times R n_1 = 0,\ T_\times = \begin{bmatrix} 0 & -T_z & T_y \\ T_z & 0 & -T_x \\ -T_y & T_x & 0 \end{bmatrix}.$$

14. The system of claim 11, further comprising approximating R by applying the following equations based on an assumption that a translation between coordinate systems of each corresponding pair of the plurality of cameras is constant:

$$R = R_0 \Delta R \simeq R_0(1+\Omega) \quad \Omega = \begin{bmatrix} 0 & -\Omega_z & \Omega_y \\ \Omega_z & 0 & -\Omega_x \\ -\Omega_y & \Omega_x & 0 \end{bmatrix},$$

wherein $\Omega_x$, $\Omega_y$, and $\Omega_z$ are rotation angles around corresponding x, y, and z axes.

15. The system of claim 10, wherein generating the closed-loop constraints comprises multiplying all corresponding rotation matrices together in a closed-loop fashion.

16. The system of claim 10, wherein detecting the plurality of CP comprises utilizing a standard feature descriptor.

17. The system of claim 16, wherein detecting the plurality of CP further comprises:

filtering the plurality of CP by utilizing the epipolar constraints and a disparity map to filter matching points determined by the descriptor with original transformations after normalization; and rejecting matching points determined by the descriptor that occur more than a specific number of times in the epipolar equations, wherein rejecting the matching points is based on a disparity criterion for rejecting points that are closer than a specific distance to or farther than a specific distance from the vehicle.

18. The system of claim 10, wherein the plurality of cameras comprise cameras located at a front of the vehicle, at a rear of the vehicle, at a left side of the vehicle and at a right side of the vehicle.

* * * * *